US008000594B2

(12) United States Patent
Messina

(10) Patent No.: US 8,000,594 B2
(45) Date of Patent: Aug. 16, 2011

(54) DIFFUSE REFLECTIVE ILLUMINATOR

(75) Inventor: Michael C. Messina, Hooksett, NH (US)

(73) Assignee: Microscan Systems, Inc., Renton, WA (US)

( * ) Notice: Subject to any disclaimer, the term of this patent is extended or adjusted under 35 U.S.C. 154(b) by 0 days.

(21) Appl. No.: 12/497,265

(22) Filed: Jul. 2, 2009

(65) Prior Publication Data

US 2011/0002682 A1 Jan. 6, 2011

(51) Int. Cl.
*G03B 15/06* (2006.01)
*G03B 15/02* (2006.01)

(52) U.S. Cl. ............................... 396/199; 362/3; 362/11

(58) Field of Classification Search ................ 396/4, 21, 396/71, 174, 199, 200, 544; 348/370, 371; 362/3, 11
See application file for complete search history.

(56) References Cited

U.S. PATENT DOCUMENTS 3,614,449 A 10/1971 Ward, III
4,099,221 A * 7/1978 Carrillo ........................... 362/18
4,594,645 A 6/1986 Terashita
4,653,875 A 3/1987 Hines
5,172,005 A * 12/1992 Cochran et al. .......... 250/559.08
5,408,084 A 4/1995 Brandorff et al.
5,461,417 A 10/1995 White et al.
5,539,485 A 7/1996 White
5,604,550 A 2/1997 White
5,619,029 A 4/1997 Roxby et al.
5,684,530 A 11/1997 White
5,761,540 A 6/1998 White
5,859,418 A 1/1999 Li et al.
5,903,394 A 5/1999 Sipotz, Jr.
5,999,751 A * 12/1999 Imamura et al. .............. 396/200
6,052,534 A * 4/2000 Goto ............................... 396/71
6,247,645 B1 6/2001 Harris et al.
6,324,024 B1 11/2001 Shirai et al.
6,552,783 B1 4/2003 Schmidt et al.
7,198,384 B2 * 4/2007 Kakiuchi et al. .............. 362/293
7,510,120 B2 3/2009 Reichenbach et al.
7,783,178 B2 * 8/2010 Liu ................................... 396/4
2001/0026320 A1 * 10/2001 Seo ............................... 348/222
2004/0001344 A1 1/2004 Hecht
(Continued)

FOREIGN PATENT DOCUMENTS

EP 0 685 140 B1 12/1995
(Continued)

OTHER PUBLICATIONS

Aim, "Direct Part Mark (DPM) Quality Guideline", AIM Inc., Dec. 12, 2006, 20 pages.
PCT/US2010/039536, International Search Report and Written Opinion of the International Searching Authority, mail date Feb. 1, 2011 (8 pages).

*Primary Examiner* — W. B. Perkey
*Assistant Examiner* — Noam Reisner
(74) *Attorney, Agent, or Firm* — Blakely Sokoloff Taylor & Zafman LLP

(57) ABSTRACT

An apparatus including a curved light-reflecting surface including a pair of opposing curved edges and a pair of opposing longitudinal edges that extend between corresponding endpoints of the opposing curved edges; a pair of reflective surfaces, each reflective surface being attached to a corresponding one of the curved edges; at least one flange coupled to one of the pair of longitudinal edges and projecting toward the opposing longitudinal edge; and at least one light source mounted on the at least one flange. Other embodiments and aspects are also disclosed and claimed.

35 Claims, 7 Drawing Sheets

U.S. PATENT DOCUMENTS

| | | | |
|---|---|---|---|
| 2005/0030960 A1 | 2/2005 | Sumida et al. | |
| 2005/0237423 A1 | 10/2005 | Nilson et al. | |
| 2008/0106794 A1 | 5/2008 | Messina | |
| 2008/0137323 A1* | 6/2008 | Pastore | 362/11 |
| 2008/0137324 A1 | 6/2008 | Pastore | |
| 2008/0137325 A1 | 6/2008 | Pastore | |
| 2008/0158854 A1 | 7/2008 | Matsui | |
| 2008/0170380 A1 | 7/2008 | Pastore | |
| 2009/0003810 A1 | 1/2009 | Dunn et al. | |
| 2011/0008035 A1 | 1/2011 | Messina et al. | |

FOREIGN PATENT DOCUMENTS

| | | |
|---|---|---|
| EP | 1 455 179 A1 | 9/2004 |
| WO | WO 99/22224 | 5/1999 |
| WO | WO 99/40361 A1 | 8/1999 |
| WO | WO 02/075637 A1 | 9/2002 |
| WO | WO 2005/043449 A1 | 5/2005 |
| WO | WO/2008/039541 A2 | 4/2008 |

* cited by examiner

DIFFUSE REFLECTIVE ILLUMINATOR

TECHNICAL FIELD

The present invention relates generally to illumination systems and in particular, but not exclusively, to a diffuse reflective illuminator.

BACKGROUND

Optical data-reading systems have become an important and ubiquitous tool in tracking many different types of items and machine-vision systems have become an important tool for tasks such as part identification and inspection. Both optical data-reading systems and machine vision systems capture a two-dimensional digital image of the optical symbol (in the case of an optical data-reading system) or the part (in the case of a general machine-vision system) and then proceed to analyze that image to extract the information contained in the image. One difficulty that has emerged in machine vision systems is that of ensuring that the camera acquires an accurate image of the object; if the camera cannot capture an accurate image of the object, the camera can be unable to decode or analyze the image, or can have difficulty doing so.

One of the difficulties in acquiring an accurate image is ensuring that the object being imaged is properly illuminated. Problems can arise whenever the lighting is of the wrong type or suffers from problems such as non-uniformity. Illuminators exist to provide lighting for optical data-reading systems and machine vision systems, but these have some known shortcomings. Existing illuminators are often round, making them larger than needed and difficult to manufacture. The round shape also makes their lighting pattern a different shape than the field of view of the imager, which can lead to non-uniform lighting, especially near the edges of the image. Other types of existing illuminators can reduce some of these shortcomings, but none overcomes most or all of them.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of an apparatus, system and method for diffuse reflective illumination are described herein. In the following description, numerous specific details are described to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 1A:
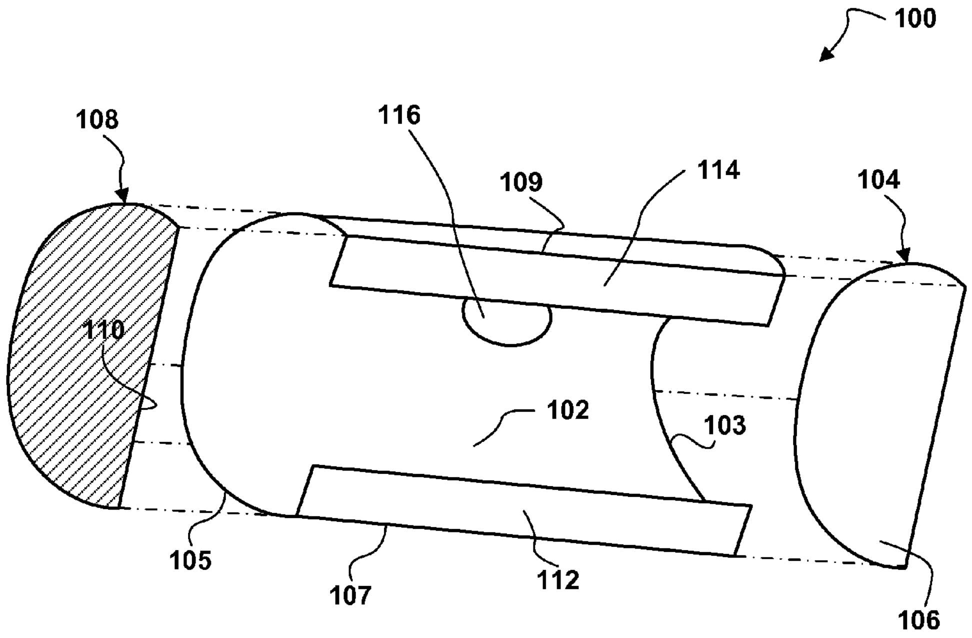
FIG. 1A is an exploded perspective view of an embodiment of an illuminator.
Figure 1B:
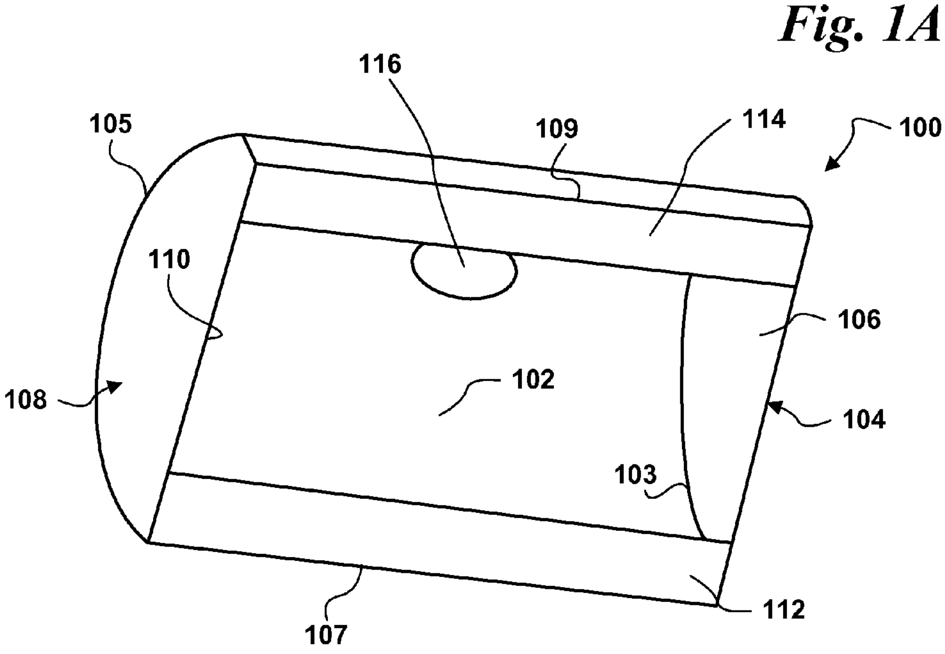
FIG. 1B is an assembled perspective view of the embodiment of an illuminator shown in FIG. 1A.

FIGS. 1A and 1B together illustrate an embodiment of an illuminator 100; FIG. 1A illustrates an exploded view, while FIG. 1B illustrates an assembled view. Illuminator 100 includes curved light-reflecting surface 102 that is bounded by curved edges 103 and 105, as well as by longitudinal edges 107 and 109. In the context of this application, "curved edges" includes any edge that is not a single straight line and includes, without limitation, curves that are smooth and continuous as well as curves made up of multiple straight or non-straight line segments, whether continuous or not. In the illustrated embodiment curved surface 102 is concave, but in other embodiments it can be convex or can be some combination of concave and convex.

End cap 104 is attached to curved edge 103, while end cap 108 is attached to curved edge 105. A flange 112 is coupled to longitudinal edge 107 and projects from edge 107 toward the opposite longitudinal edge 109. Similarly, flange 114 is coupled to longitudinal edge 109 and projects toward opposite longitudinal edge 107. Although not visible in these figures, flanges 112 and 114 have light sources 118 mounted thereon on the sides of the flanges that face surface 102 (see, e.g., FIGS. 2A-2C). An optional imaging aperture 116 can be formed in curved light-reflecting surface 102.

Each of longitudinal edges 107 and 109 extends from an endpoint of edge curved edge 103 to a corresponding endpoint of curved edge 105 to form surface 102. In the embodiment shown, curved edges 103 and 105 both have the same size and shape and longitudinal edges 107 and 109 are straight, meaning that surface 102 is shaped substantially like an open right semi-circular cylinder. Put differently, in the illustrated embodiment curved light-reflecting surface 102 results from translating curved edge 103 in a straight line through space until it reaches or becomes curved edge 105. In other embodiments, however, curved edges 103 and 105 can have other shapes besides semi-circular (see FIGS. 4A-4E), and in still other embodiments curved edges 103 and 105 need not have the same size and/or shape, nor do longitudinal edges 107 and 109 need to have the same size and/or shape.

End caps 104 and 108 are attached curved edges 103 and 105 and should substantially cover the open ends of the curved light-reflecting surface 102. In the illustrated embodiment, end caps 104 and 108 have substantially the same cross-sectional shape as the open ends of curved surface 102, but in other embodiments the end caps need not have exactly the same shape as the open ends. For example, one or both of end caps 104 and 108 could be square, so long as they substantially cover the ends of curved surface 102.

Figure 2A:
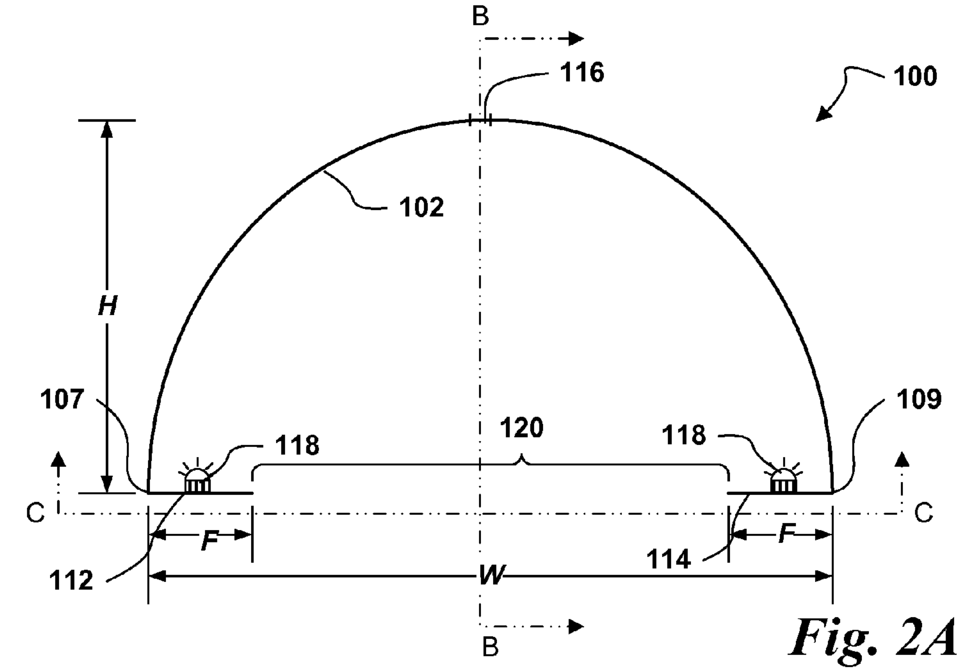
FIG. 2A is a side elevation view of the embodiment of an illuminator shown in FIGS. 1A-1B.

FIG. 2A illustrates a side elevation of illuminator 100. In the illustrated embodiment, curved light-reflecting surface 102 has a semi-circular cross-section when viewed from the side (i.e., curved edges 103 and 105 are both semi-circular), which results in curved surface 102 being shaped like an open right semi-circular cylinder. In the embodiment shown, curved surface 102 is formed by bending a lamina into the appropriate shape to create the desired shape for surface 102. In one embodiment the lamina can be sheet metal, but in other embodiments a lamina made of other materials such as sheets of plastic or some kind of composite can be used. In still other embodiments surface 102 can be formed differently. For example, in one embodiment surface 102 can be machined out of a solid block of metal, plastic, wood, or some kind of composite. Imaging aperture 116 can be formed in curved surface 102.

Curved light-reflecting surface 102 is designed to reflect and/or diffuse incident light from light sources 118. Curved surface 102 has a height H and width W, both of which are chosen based on the particular application and its requirement. For a given application, curved surface 102 should also have the appropriate physical and/or optical properties—such as color, texture and reflectivity—to create the desired reflection and diffusion. In one embodiment the physical and/or optical characteristics of surface 102 can be matched to enhance or supplement the optical characteristics of light sources 118, bit in other embodiments the physical and/or optical characteristics of surface 102 can be used to change of modify the optical characteristics of light emitted by light sources 118. For instance, in an embodiment where light sources 118 emit white light, by applying an appropriately colored coating to curved light-reflecting surface 102 the white light from light sources 118 can be filtered such that the color of light exiting the illuminator through opening 120 is not white.

The material from which surface 102 is made may already have the correct physical and/or optical properties, such that no further processing is needed once curved light-reflecting surface 102 has been formed. For example, in an embodiment in which surface 102 is formed by bending a lamina around a mold, the lamina could be of a plastic that already has the correct color, texture and reflectivity, meaning that nothing further needs to be done to the surface after it is formed. In other embodiments where the material does not have the needed color, reflectivity or texture—such as when curved surface 102 is formed of metal—then additional treatment may be needed to give curved light-reflecting surface 102 the correct physical and/or optical properties. In one embodiment, a coating such as paint can be applied to the surface. In other embodiments other treatments such as sheets of material with the correct physical and/or optical properties can be laid on curved light-reflecting surface 102 and secured with adhesive.

Flange 112 has a width F and is coupled to longitudinal edge 107 and projects from edge 107 toward the opposite longitudinal edge 109. Similarly, another flange 114 has a width F and is coupled to longitudinal edge 109 and projects toward opposite longitudinal edge 107. In the embodiment shown, flanges 112 and 114 are positioned such that they are approximately co-planar, but in other embodiments they need not be co-planar. Flanges 112 and 114 have light sources 118 mounted thereon on the sides of the flanges that face toward surface 102. In one embodiment, flanges 112 and 114 can be integrally formed with surface 102, meaning that surface 102 and flanges 112 and 114 are formed of a single piece of material. In other embodiments, one or both of flanges 112 and 114 can be separate pieces that are attached to surface 102, or to the material from which surface 102 is made, by various means including adhesives, fasteners, welding, soldering, braising, etc.

During operation of illuminator 100, light sources 118 emit light that is incident on curved surface 102. Upon striking surface 102, light from each of the light sources 118 is reflected and diffused, such that uniform and diffuse light exits the illuminator through opening 120.

Figure 2B:
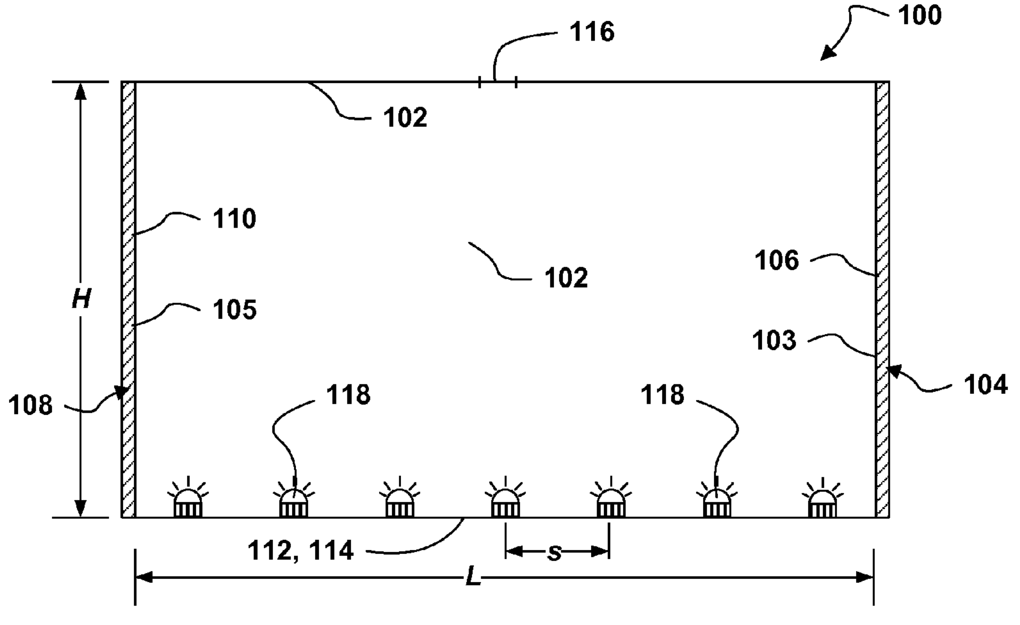
FIG. 2B is a front elevation view of the embodiment of an illuminator shown in FIGS. 1A-1B viewed from section line B-B in FIG. 2A.

FIG. 2B illustrates a side elevation cross-section of illuminator 100. Curved light-reflecting surface 102 has a length L, meaning that curved edges 103 and 105 are spaced apart by L; as with the illuminator's height H and width W, length L can be chosen based upon the application requirements. End cap 104 includes a reflective side 106 and end cap 108 includes a reflective side 110. End caps 104 and 108 are attached to the curved edges of surface 102 with their reflective surfaces 106 and 110 parallel or substantially parallel to each other and facing each other. Reflective surfaces 106 and 110 are therefore also spaced apart by approximately distance L. In other embodiments, however, reflective surfaces 106 and 110 need not be parallel, but can be at an angle with respect to each other.

In one embodiment reflective surfaces 106 and 110 are mirrors, but in other embodiments they can be other types of surface with reflectivities equal to or less than a mirror. In one embodiment, reflective surfaces 106 and 110 are first-surface mirrors, meaning that the reflective surface must be the first surface encountered by incident light. In other embodiments other kinds of mirror can be used. Reflective surfaces 106 and 110 can be formed in different ways. For instance, if end caps 104 and 108 are metal, reflective surfaces 106 and 110 can be formed by polishing the appropriate surface of each end cap. In other embodiments, a reflective coating can be applied to end caps 104 and 108, for example by spraying or by securing a sheet of reflective materials to the appropriate surface of each end cap. In still other embodiments more sophisticated methods such as electrolytic plating can be used.

Flanges 112 and 114 extend the entire length L of curved surface 102 between reflective surfaces 106 and 110. Light sources 118 are positioned on flanges 112 and 114, along with provisions for delivering electrical power to the light sources. The type and number of light sources 118 will depend on the type of light source used, as well as the power requirements of the application and the desired lighting characteristics such as color and uniformity. In one embodiment light sources 118 can be light emitting diodes (LEDs), but in other embodiments light sources 118 can be some other type of light source, such as an incandescent or halogen light bulbs. In still other embodiments, light sources 118 need not all be the same kind, but can instead include combinations of two or more different types of light source. The spacing between light sources will generally depend on the number of light sources 118 and the length of the flange or flanges on which they are mounted. The illustrated embodiment shows light sources uniformly 118 spaced at an interval s, but in other embodiments light sources 118 need not be uniformly spaced.

Figure 2C:
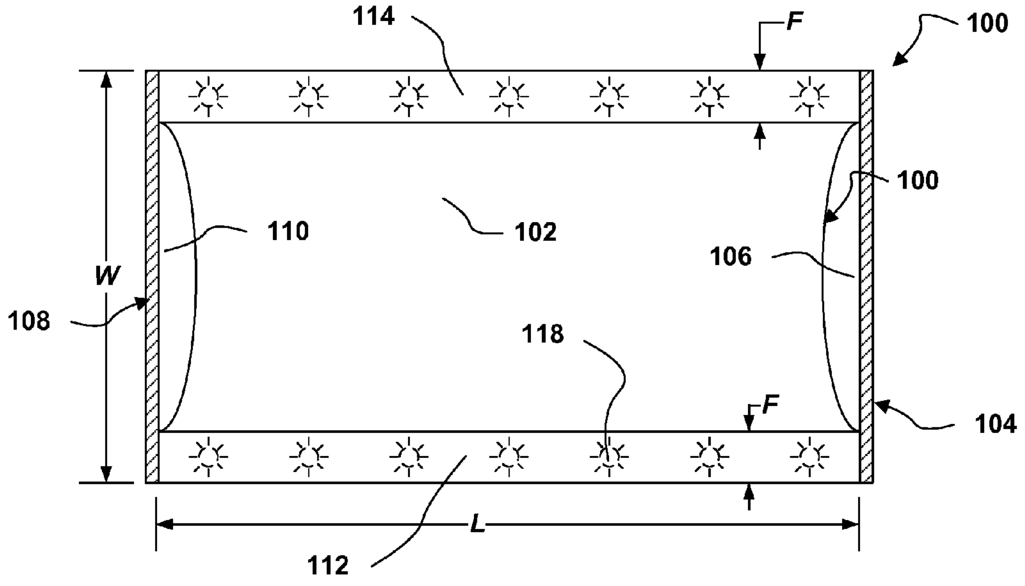
FIG. 2C is a bottom view of the embodiment of an illuminator shown in FIGS. 1A-1B viewed from section line C-C in FIG. 2A.

FIG. 2C shows a bottom view of illuminator 100. Both end caps 104 and 108 are attached to curved surface 102 such that reflective surfaces 106 and 110 face each other and are spaced apart by approximately distance L. In the illustrated embodiment each of flanges 112 and 114 has the same width F and spans substantially the entire length L between reflective surfaces 106 and 110. In other embodiments flanges 112 and 114 need not have the same width F, but can instead have different lengths (see FIG. 3C). In still other embodiments flanges 112 and 114 can have different configurations (see FIGS. 5A-5C), and can have a length less than L and also need not have the same length L, but can instead have different lengths (see FIG. 3C). It is also possible in other embodiments to have multiple separate flanges spanning the distance between reflective surfaces 106 and 110 instead of a single flange. Yet another embodiment can include only one of flanges 112 and 114, and the flange that is present can have a length greater or less than length L.

Figure 2D:
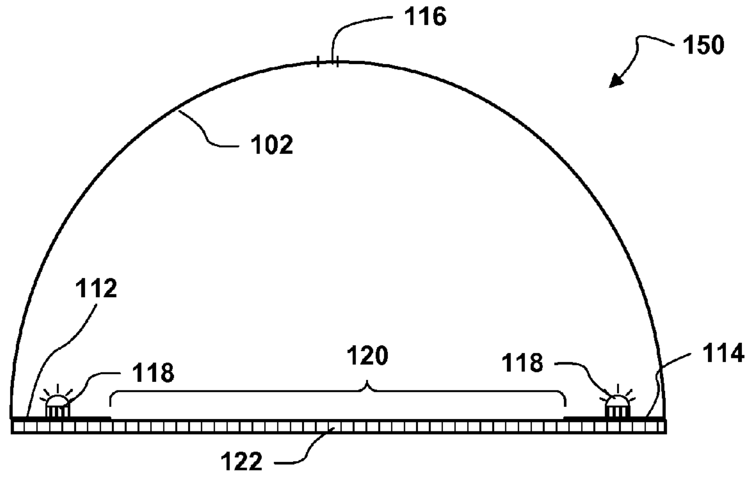
FIG. 2D is a side elevation view of an alternative embodiment of an illuminator that includes a bottom cover.

FIG. 2D illustrates a side elevation of an alternative embodiment of an illuminator 150. Illuminator 150 is in most respects similar to illuminator 100. The primary difference is that illuminator 150 includes a cover 122 over the bottom of the illuminator to prevent contaminants or other objects from entering the illuminator through opening 120 and damaging the components in it. Although in the illustrated embodiment cover 122 is shown mounted to the exterior side of flanges 112 and 114, in other embodiments cover 122 could be mounted to the inside of the flanges or to some other part of the illuminator. In one embodiment cover 122 is transparent and is very thin to avoid compromising the optical uniformity of the illuminator, but in other embodiments the thickness of cover 122 can be greater or smaller and cover 122 can be made of a translucent material to provide additional diffusion. In still other embodiments, cover 122 can be a composite that includes at least two different portions selected from transparent, translucent or opaque. In some embodiments, cover 122 can include an anti-reflective coating on the inside, outside, or both the inside and the outside.

Figure 3A:
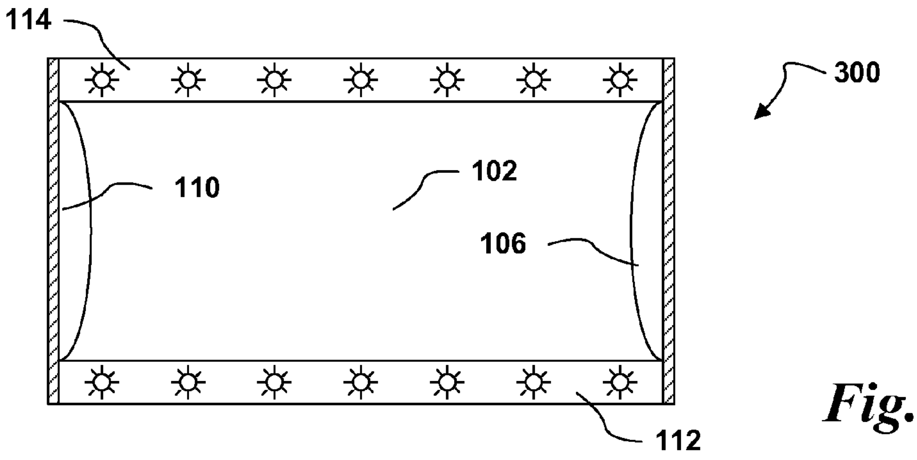
FIG. 3A-3C are plan views of the bottom of alternative embodiments of an illuminator.
Figure 3B:
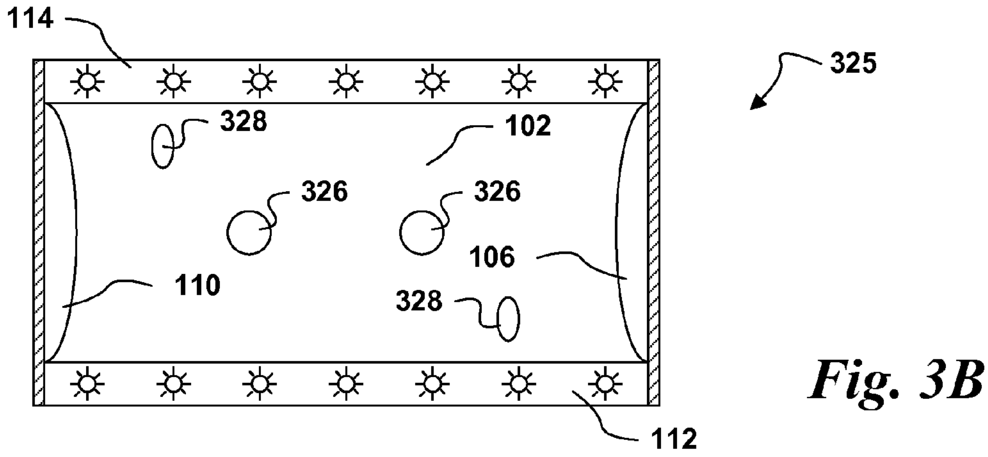
Figure 3C:
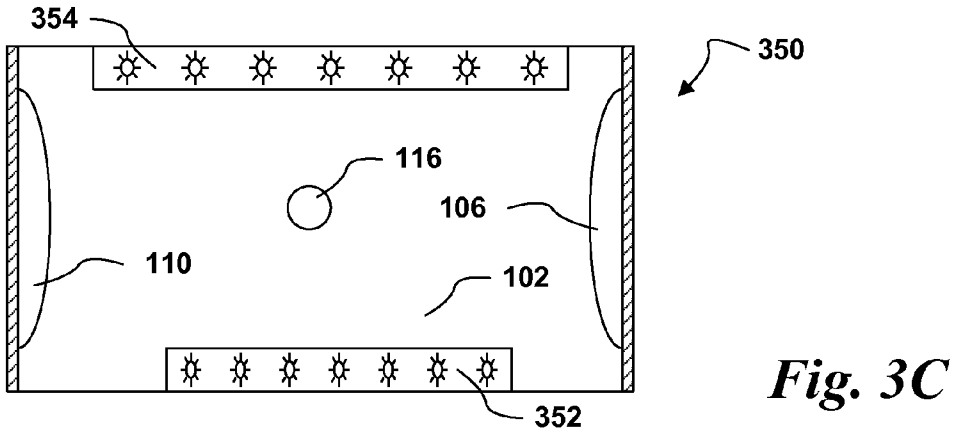

FIGS. 3A-3C illustrate various alternative embodiments of an illuminator. FIG. 3A illustrates an illuminator 300 that, in most respects, is similar to illuminator 100. The principal difference between illuminator 300 and illuminator 100 is that illuminator 300 lacks an imaging aperture. Illuminator 300 can be used in applications where the illuminator is a stand-alone unit separate from the imaging apparatus. FIG. 3B illustrates an illuminator that is also similar in most respects to illuminator 100. The principal difference between illuminator 325 and illuminator 100 is the presence in illuminator 325 of multiple imaging apertures. These can include apertures 326 that are positioned on or near the centerline (e.g., at or near the vertex or cusp) curved surface 102, as well as apertures 328 that are positioned off the vertex or cusp of surface 102. FIG. 3C illustrates yet another illuminator 350 that in most respects is similar to illuminator 100. The principal difference between illuminator 350 and illuminator 100 is that in illuminator 350 the flanges 352 and 354 are of different lengths and do not span the entire distance between reflective surfaces 106 and 110. Of course, any of illuminators 300, 325 and 350 can have a curved surface with any of the shapes shown in FIGS. 4A-4E and, moreover, features of illuminators 300, 325 and 350 can be combined with each other.

Figure 4A:
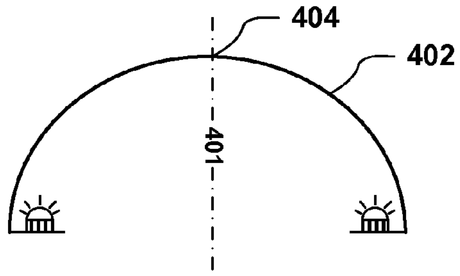
FIGS. 4A-4F are side elevation views of alternative embodiments of an illuminator.
Figure 4B:
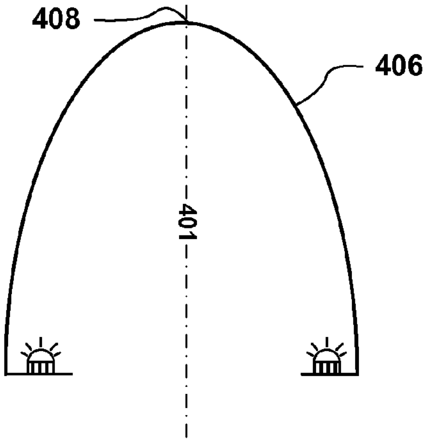
Figure 4C:
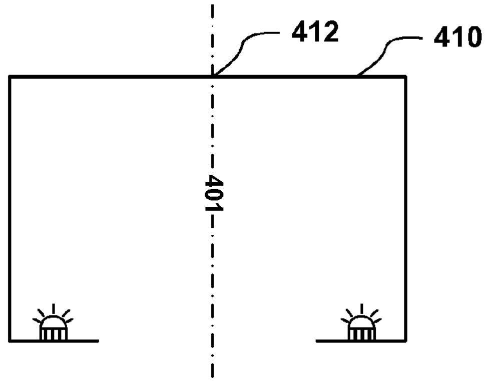
Figure 4D:
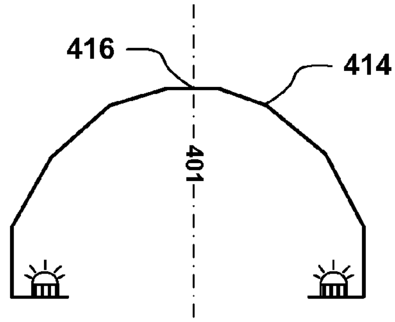

FIGS. 4A-4F illustrate cross-sections of various alternative embodiments of an illuminator. FIG. 4A illustrates an embodiment in which the two curved edges of curved surface 402 are semi-elliptical and symmetrical about centerline 401, making curved surface 402 an open right semi-elliptical cylinder with its apex or cusp 404 aligned with the centerline. FIG. 4B illustrates an embodiment in which the two curved edges of curved surface 406 are parabolic and symmetrical about centerline 401, making the curved surface an open right parabolic cylinder its apex or cusp 408 aligned with the centerline. FIG. 4C illustrates an embodiment in which the curved edges of curved surface 410 are square and symmetrical about centerline 401, making curved surface 410 an open right square cylinder with its apex or cusp 412 aligned with centerline 401. FIG. 4D illustrates an embodiment in which the two curved edges of curved surface 414 are faceted (i.e., made up of a plurality of line segments) and symmetrical about centerline 401, making curved surface 414 an open right faceted cylinder with its apex or cusp 416 aligned with centerline 401.

Figure 4E:
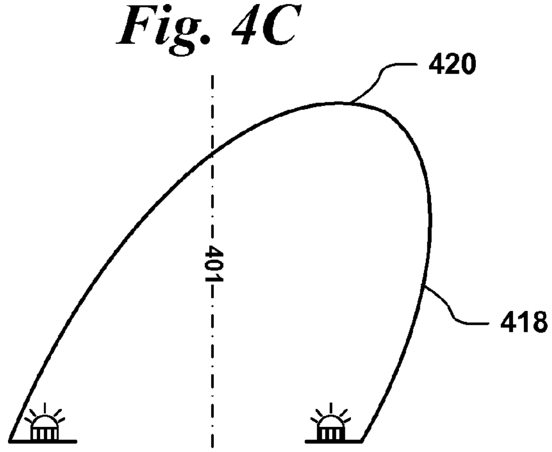
Figure 4F:
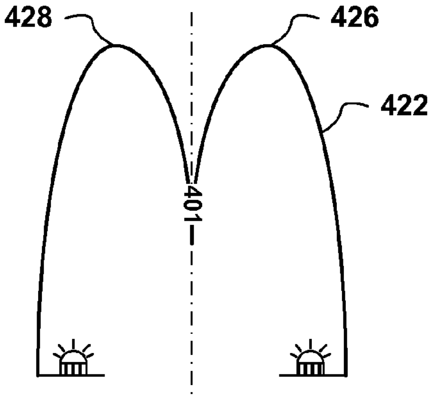

FIG. 4E illustrates an embodiment in which the curved edges of curved surface 418 are skewed parabolas that are not symmetrical about centerline 401, making curved surface a skewed right parabolic cylinder with its apex or cusp 420 offset from centerline 401. Finally, FIG. 4F illustrates an embodiment in which the curved edges of curved surface 422 are compound curves, such as the illustrated M-shaped curve that is symmetric about centerline 401 and has two cusps 426 and 428. In other embodiments with a compound curve, the curve need not be symmetrical about centerline 401. For example, in other embodiments the compound curve can be skewed as shown in FIG. 4E, or the cusps 426 and 428 need not have the same height.

FIGS. 4A-4F are not intended to present an exhaustive catalog of possible shapes for a curved surface. In other embodiments, other shapes besides those shown can be used. For instance, in another embodiment any polynomial function can be used to form a curved surface, while in other embodiments other types of functions—such as exponential, logarithmic or hyperbolic functions—can be used.

Figure 5A:
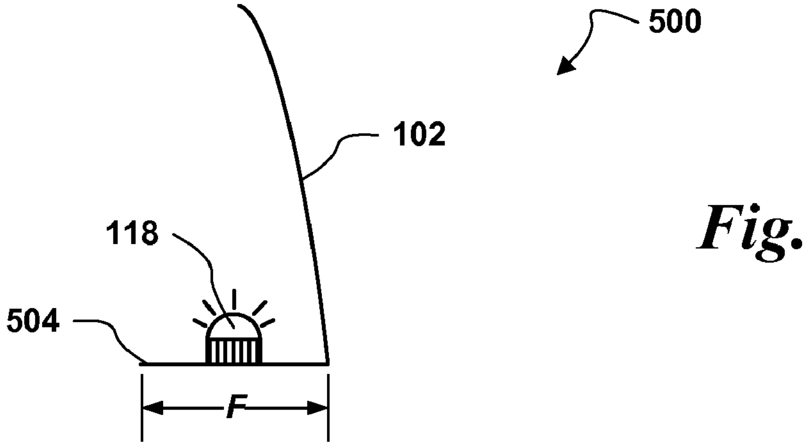
FIGS. 5A-5C are side elevation views of various alternative embodiments of a flange for an illuminator.
Figure 5B:
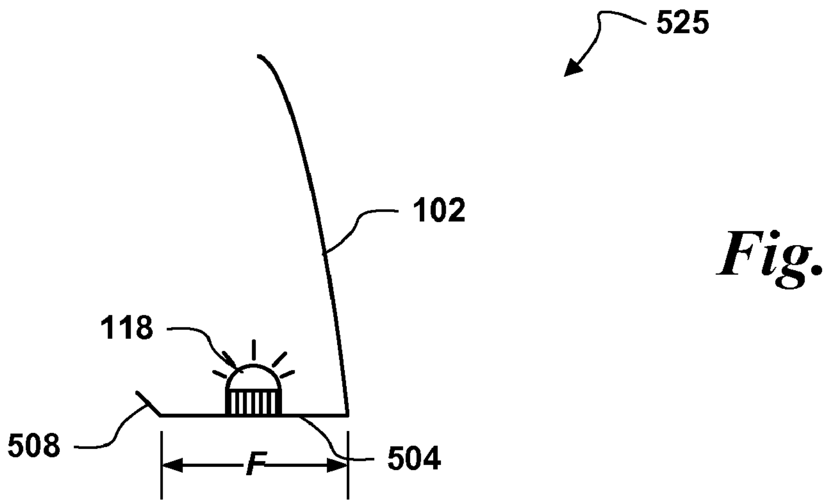
Figure 5C:
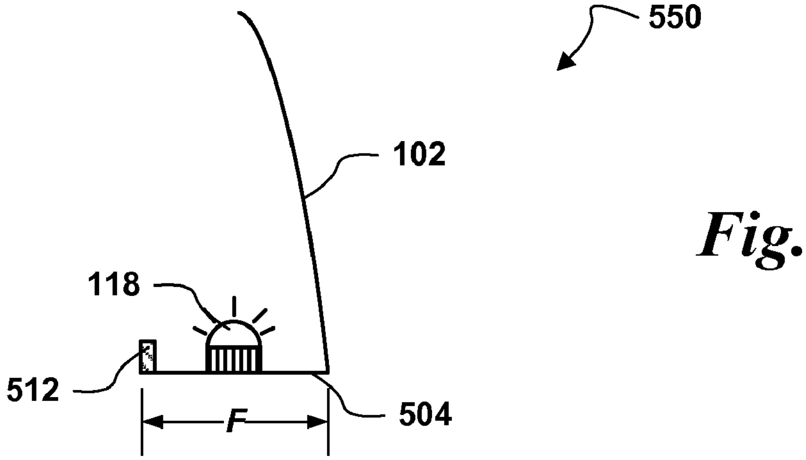

FIGS. 5A-5C illustrate alternative flange embodiments that can be used in different embodiments of an illuminator. FIG. 5A illustrates an embodiment 500 in which a flange 504 is coupled to curved surface 102. In the illustrated embodiment flange 504 is substantially flat and projects from a longitudinal edge of curved surface 102. Flange 504 has a width F. Generally F can be sized so that no direct light from light sources 118 exits the illuminator through opening 120 (see, e.g., FIG. 2A); in other words, width F is sized so that all light that exits the illuminator is light that is reflected and diffused by curved light-reflecting surface 102 and none of the light exiting opening 120 comes directly from light source 118.

FIG. 5B illustrates an alternative flange embodiment 525 in which flange 504 has its free edge (i.e., the edge not connected to curved surface 102) has an upturned portion 508. Upturned portion 508 can help in keeping light from light sources 118 from directly exiting the illuminator through opening 120 (see, e.g., FIG. 2A). With the presence of upturned portion 508, it can also be possible to reduce the width F of the flange while still preventing direct light from light sources 118 from leaving the illuminator. In one embodiment, upturned portion 508 can run along the entire length of the flange, but in other embodiments upturned portion 508 can be present only along portions of the length of the flange.

FIG. 5C illustrates an alternative flange embodiment 550 in which flange 504 has a baffle 512 positioned at or near its free edge (i.e., the edge not connected to curved surface 102). In one embodiment, baffle 512 can be made of an opaque material, but in other embodiments baffle 512 can be made of a translucent or transparent material. In still other embodiments, baffle 152 can be made of some combination of two or more of opaque, translucent or transparent material. By correctly sizing, positioning and choosing materials for baffle 512, the baffle can help keep light from light sources 118 from directly exiting the illuminator through opening 120 (see, e.g., FIG. 2A). The presence of baffle 512 can make it possible to reduce the width F of the flange while still preventing direct light from light sources 118 from leaving the illuminator. In one embodiment, baffle 512 can run along the entire length of the flange, but in other embodiments baffle 512 can be present only along portions of the length of the flange.

Figure 6:
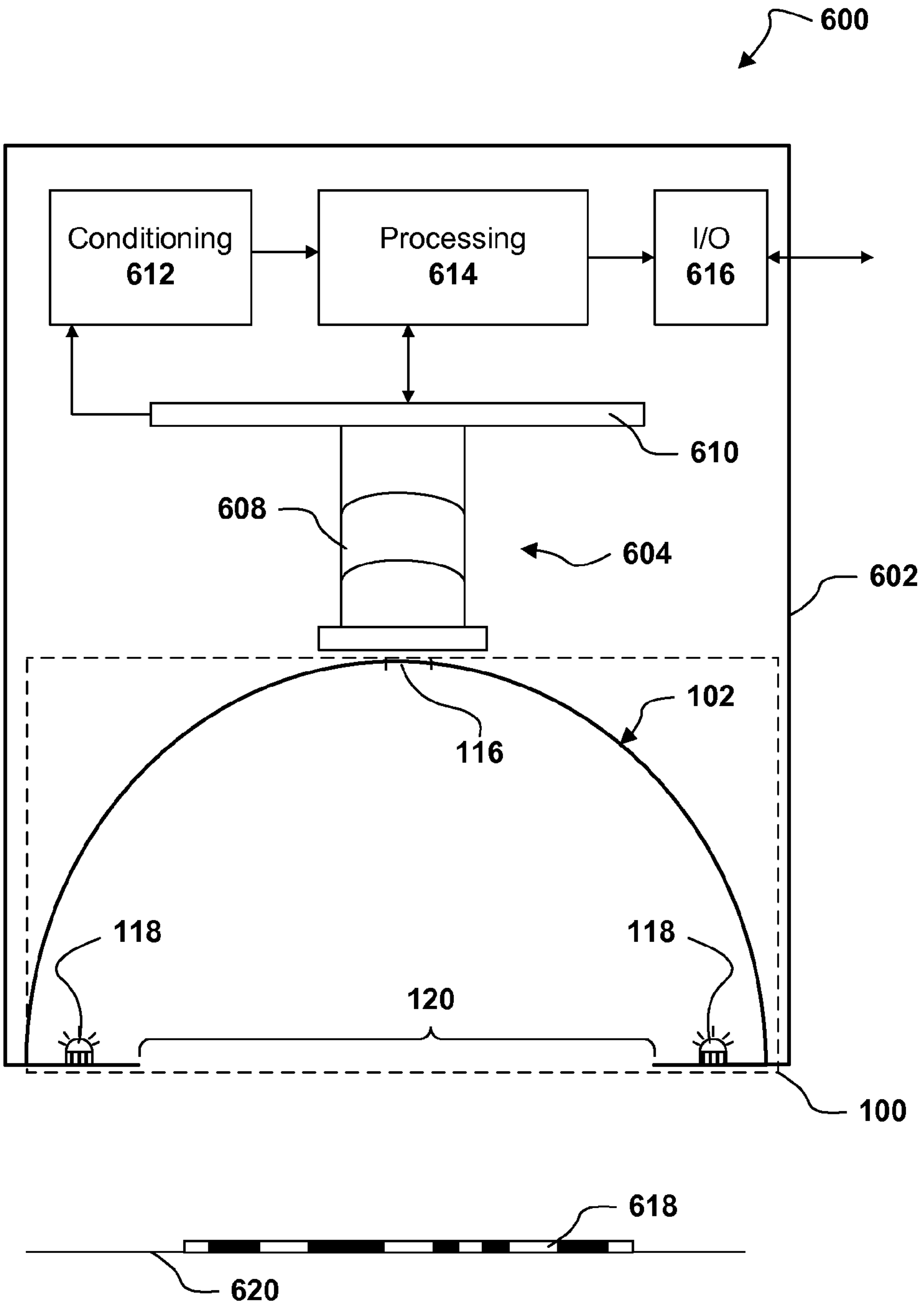
FIG. 6 is a schematic diagram of an imaging system incorporating an embodiment of an illuminator.

FIG. 6 illustrates an imaging system 600 that incorporates illuminator 100; of course, in other embodiments of imaging system 600 the illuminator 100 can be replaced with any of the other illuminator embodiments described herein. Imaging system 600 includes a housing 602 within which are positioned illuminator 100 and camera 604. In addition to camera 604 and illuminator 100, imaging system 600 includes a signal conditioner 612 coupled to image sensor 610, a processor 614 coupled to signal conditioner 612, and an input/output unit 616 coupled to processor 614. Although not shown, an internal or external power supply provides electrical power to the components within housing 602. In one embodiment, imaging system 600 can be a small portable handheld system, but in other embodiments it can be a fixed-mount imaging system.

Illuminator 100 is positioned within housing 602 such that opening 120 will face toward an object to be illuminated and imaged. In the illustrated embodiment, the object to be illuminated and images is an optical symbol such as a bar code or matrix code 618 on a surface 620, but in other embodiments the object can be a part or surface of a part that is subject to machine vision inspection. Curved surface 102 extends into the interior of housing 602 and includes imaging aperture 116 near its cusp or apex. When power is supplied to light sources 118, light from the light sources is incident on curved light-reflecting surface 102, which then reflects and diffuses the light and directs it toward opening 120, where it exits the illuminator and falls on object 618 and/or surface 620.

Camera 604 includes optics 608 coupled to an image sensor 610. In one embodiment, optics 608 include one or more refractive lenses, but in other embodiment optics 608 can include one or more of refractive, reflective or diffractive optics. In one embodiment, image sensor 610 includes a CMOS image sensor, although in other embodiments different types of image sensors such as CCDs can be used. Camera 604 and optics 608 are positioned within housing 602 such that optics 608 are optically aligned with imaging aperture 116 in curved surface 102. Optically aligning optics 608 with imaging aperture 116 allows optics 608 to focus an image of object 618 onto image sensor 610, enabling image sensor 610 to capture an image of object 618 while illuminator 100 simultaneously illuminates the object.

Signal conditioner 612 is coupled to image sensor 610 to receive and condition signals from a pixel array within image sensor 610. In different embodiments, signal conditioner 612 can include various signal conditioning components such as filters, amplifiers, offset circuits, automatic gain control, analog-to-digital converters (ADCs), digital-to-analog converters, etc. Processor 614 is coupled to signal conditioner 612 to receive conditioned signals corresponding to each pixel in the pixel array of image sensor 610. Processor 614 can include a processor and memory, as well as logic or instructions to process the image data to produce a final digital image and to analyze and decode the final image. In one embodiment, processor 614 can be a general-purpose processor, while in other embodiments it can be an application specific integrated circuit (ASIC) or a field-programmable gate array (FPGA).

Input/output circuit 616 is coupled to processor 614 to transmit the image and/or information decoded from the image to other components (not shown) that can store, display, further process, or otherwise use the image data or the decoded information. Among other things, input/output circuit 616 can include a processor, memory, storage, and hard-wired or wireless connections to one or more other computers, displays or other components.

In the illustrated embodiment, elements 612, 614 and 616 are shown co-housed with camera 601 and illuminator 100, but in other embodiments, elements 612, 614 and 616 can be positioned outside housing 602. In still other embodiments one or more of elements 612, 614 and 616 can be integrated within image sensor 610.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. An apparatus comprising:

a curved light-diffusing surface including a pair of opposing curved edges and a pair of opposing longitudinal edges that extend between corresponding endpoints of the opposing curved edges;

a pair of specular reflective surfaces, each specular reflective surface being attached to a corresponding one of the curved edges;

at least one flange coupled to one of the pair of longitudinal edges and projecting toward the opposing longitudinal edge; and at least one light source mounted on the at least one flange.

2. The apparatus of claim 1 wherein the light-diffusing surface has a light-diffusing coating thereon.

3. The apparatus of claim 1 wherein the pair of specular reflective surfaces are planar and are parallel to each other.

4. The apparatus of claim 1 wherein the pair of opposing longitudinal edges are co-planar.

5. The apparatus of claim 1, further comprising an imaging aperture in the light-diffusing surface.

6. The apparatus of claim 1 wherein the light-diffusing surface is smooth and continuous.

7. The apparatus of claim 1 wherein the light-diffusing surface is faceted.

8. The apparatus of claim 1 wherein the shapes of the opposing curved edges are one of semi-circular, parabolic, hyperbolic, semi-elliptical or skewed parabolic.

9. The apparatus of claim 1 wherein the at least one light source comprises one or more of a light bulb or a light-emitting diode (LED).

10. The apparatus of claim 1 wherein a free end of the flange is bent at an angle with respect to the rest of the flange.

11. The apparatus of claim 1, further comprising a baffle positioned at or near a free end of the flange.

12. The apparatus of claim 11 wherein the baffle is transparent, translucent or opaque.

13. A system comprising:

a lighting apparatus comprising:

a curved light-diffusing surface including a pair of opposing curved edges and a pair of opposing longitudinal edges that extend between corresponding endpoints of the opposing curved edges, the light-diffusing surface having therein an imaging aperture, a pair of specular reflective surfaces, each specular reflective surface being attached to a corresponding one of the curved edges, at least one flange coupled to one of the pair of longitudinal edges and projecting toward the opposing longitudinal edge, and at least one light source mounted on the at least one flange; and a camera coupled to the lighting apparatus, the camera including imaging optics optically coupled to the imaging aperture.

14. The system of claim 13 wherein the light-diffusing surface has a light-diffusing coating thereon.

15. The system of claim 13 wherein the light-diffusing surface is smooth and continuous.

16. The system of claim 13 wherein the light-diffusing surface is faceted.

17. The system of claim 13 wherein the pair of specular reflective surfaces are planar and are parallel to each other.

18. The system of claim 13 wherein the pair of opposing longitudinal edges are co-planar.

19. The system of claim 13 wherein the shapes of the opposing curved edges are one of semi-circular, parabolic, hyperbolic, semi-elliptical or skewed parabolic.

20. The system of claim 13 wherein the at least one light source comprises one or more of a light bulb or a light-emitting diode (LED).

21. The system of claim 13, further comprising a signal conditioning circuit coupled to the camera.

22. The system of claim 21, further comprising an image processor coupled to the signal conditioning unit and to the camera.

23. The system of claim 22, further comprising an input/output unit coupled to the processor.

24. A process comprising:

forming a curved light-diffusing surface including a pair of opposing curved edges and a pair of opposing longitudinal edges that extend between corresponding end-points of the opposing curved edges;

attaching a pair of specular reflective surfaces to a corresponding one of the curved edges;

forming at least one flange on one of the pair of longitudinal edges, wherein the at least one flange projects toward the opposing longitudinal edge; and mounting at least one light source on the at least one flange.

25. The process of claim 24, further comprising depositing a light-diffusing coating on the light-diffusing surface.

26. The process of claim 24 wherein the pair of specular reflective surfaces are planar and are parallel to each other.

27. The process of claim 24 wherein the pair of opposing longitudinal edges are co-planar.

28. The process of claim 24, further comprising forming an imaging aperture in the light-diffusing surface.

29. The process of claim 24 wherein the light-diffusing surface is smooth and continuous.

30. The process of claim 24 wherein the light-diffusing surface is faceted.

31. The process of claim 24 wherein the shapes of the opposing curved edges are one of semi-circular, parabolic, hyperbolic, semi-elliptical or skewed parabolic.

32. The process of claim 24 wherein the at least one light source comprises one or more of a light bulb or a light-emitting diode (LED).

33. The process of claim 24, further comprising bending a free end of the flange an angle with respect to the rest of the flange.

34. The process of claim 24, further comprising positioning a baffle at or near a free end of the flange.

35. The process of claim 34 wherein the baffle is transparent, translucent or opaque.

* * * * *